United States Patent Office 3,102,627
Patented Sept. 3, 1963

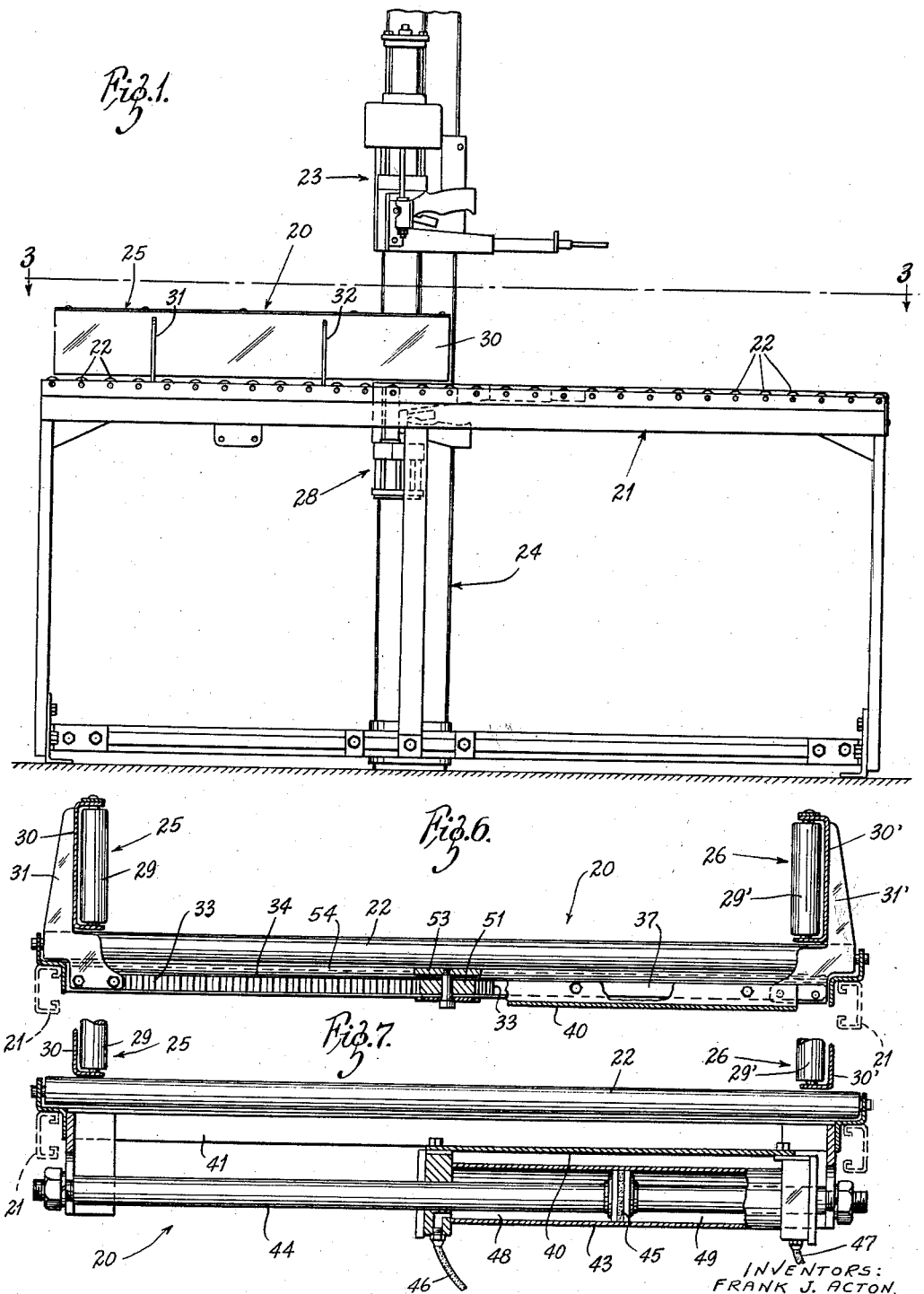

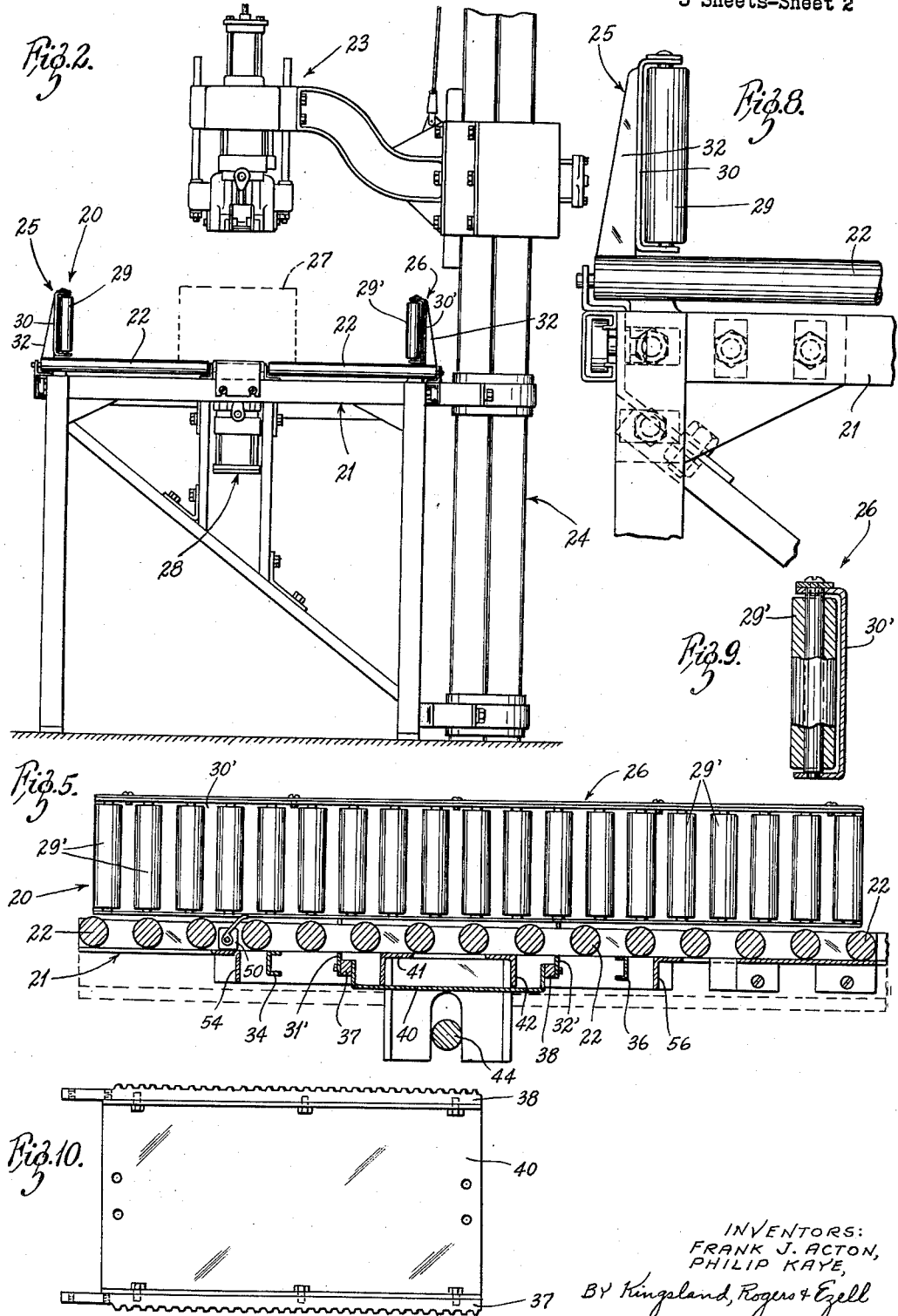

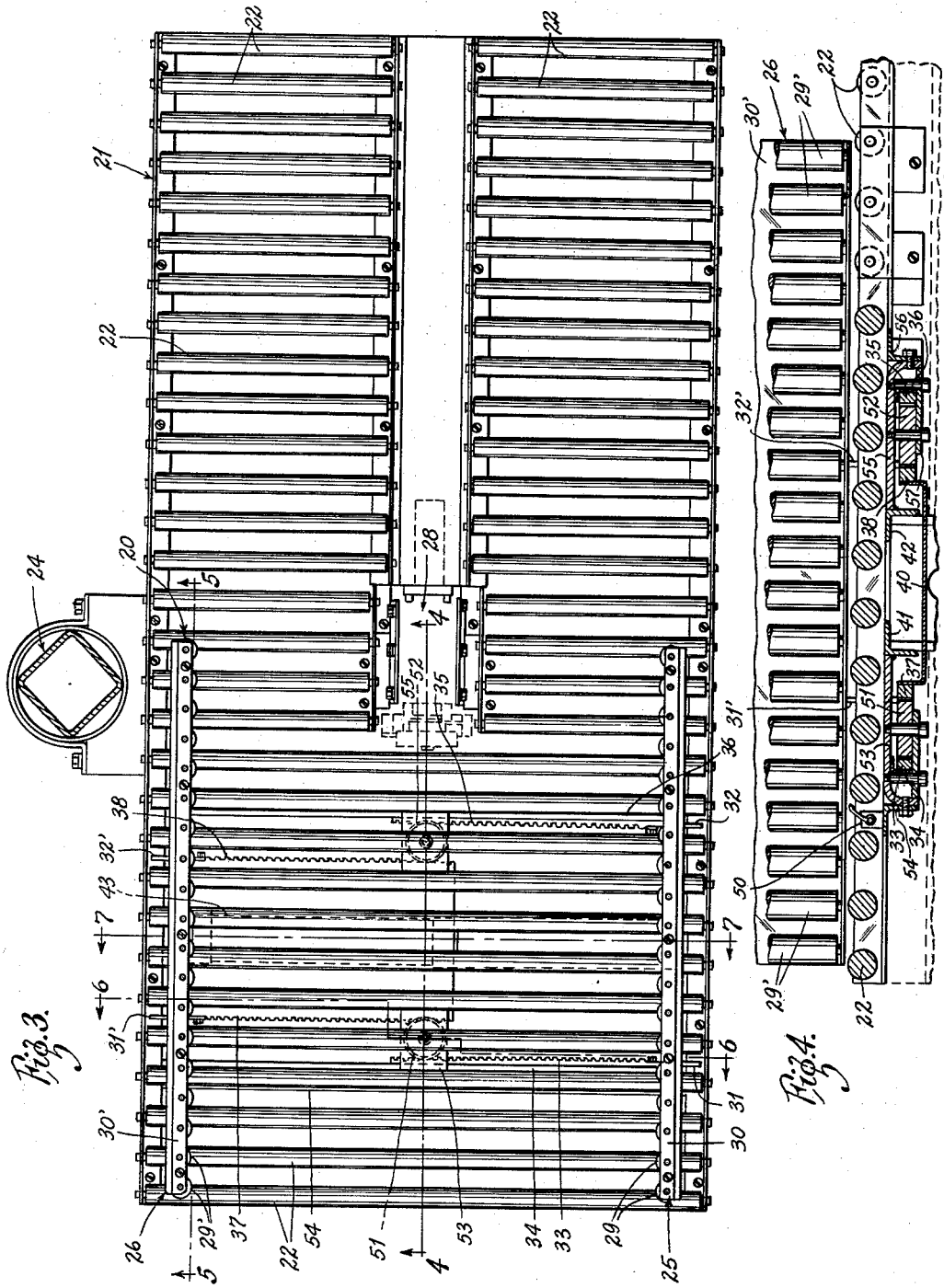

3,102,627
APPARATUS FOR CENTERING CARTONS
Frank J. Acton, Park Forest, and Philip Kaye, Norridge, Ill., assignors to International Staple and Machine Company, Herrin, Ill., a corporation of Pennsylvania
Filed Mar. 29, 1956, Ser. No. 574,866
5 Claims. (Cl. 198—29)

This invention relates to improvements in centering devices, and in particular is concerned with an apparatus employing two oppositely movable centering arms for centering objects to a desired position as the arms are brought together.

In this invention, there has been provided a pair of centering arms which are mounted upon opposed longitudinally extending racks cooperating with a pinion in such a manner that, by the movement of one rack connected to an arm, the other rack and opposite arm connected thereto are caused to be moved through the action of the pinion. Motor power is supplied through a power cylinder pneumatically operated and connected to the racks fixed to one of the arms. Thus, by the application of air or other fluid, full control and movement of the arms are effected.

The centering apparatus of this invention is particularly well adapted to be employed with conveyors for handling cartons or other objects which are desired to be brought to a certain position. In such employment, hard usage and wear are encountered and through this invention a very sturdy and well constructed, easily regulated centering device has been provided. For the purpose of illustration, the centering apparatus of this invention is shown employed with an automatic stapling machine, but it is to be understood that any type of operating device could be employed. Also the centering device need not be limited to a conveyor track or platform.

Accordingly, it is a principal object of this invention to provide a centering apparatus having oppositely movable arms which is extremely sutrdy in construction and simple in design.

A further object of this invention is to provide a centering aparatus having opposed oppositely movable centering arms connected to rigid and separate guide elements which control the movement of the arms.

Another object of this invention is to provide a centering apparatus having oppositely movable arms in which movement is effected through a pneumatic cylinder employing a movable piston wall and a stationary plunger for stability in operation and a high degree of strength.

Yet a further object of this invention is to provide a centering apparatus employing oppositely movable centering arms in which the arms are controlled by a rack and pinion structure in which movement of a single rack or rack set effects the operation of the entire apparatus.

Still another object of this invention is to provide a centering apparatus having oppositely movable arms which is of sturdy structure and can be made of readily available components at a low cost and operated and serviced by relatively inexperienced personnel.

Further objects of this invention will appear in the detailed description which follows and will be further apparent to those skilled in the art.

For the purpose of the illustration of this invention, a specific embodiment is shown in the acompanying drawings. It is to be understood that this illustration is for the purpose of example only, and that the invention is not limited thereto.

In the drawings:

FIGURE 1 is a view in front elevation of a conveyor equipped with a carton centering apparatus and showing an automatic stapling standard;

FIGURE 2 is a view in side elevation taken from the right side of FIGURE 1 of this apparatus;

FIGURE 3 is an enlarged plan view in section taken on the line 3—3 of FIGURE 1;

FIGURE 4 is an enlarged view in section taken on the line 4—4 of FIGURE 3 showing the rack and pinion structure;

FIGURE 5 is an enlarged view in section taken on the line 5—5 of FIGURE 3 showing the attachment of rack to the carton centering arm;

FIGURE 6 is a view in section taken on the line 6—6 of FIGURE 3 showing the rack and pinion structure and the attachment of the racks to the opposed carton centering arms;

FIGURE 7 is a view in section taken on the line 7—7 of FIGURE 3 showing the structure of the power cylinder and attachment to the racks;

FIGURE 8 is an enlarged fragmentary view taken from the upper left-hand corner of FIGURE 2 showing the corner structure of the front centering arm and the top of the conveyor bed;

FIGURE 9 is a view in section taken through the vertical axis of one of the rollers in the rear centering arm and showing the support plate; and FIGURE 10 is an enlarged plan view showing the two inner racks of the rear centering arm attached to a connecting plate.

In FIGURES 1, 2 and 3 the centering apparatus generally indicated at 20 is situated at the top of the conveyor table 21 which is provided with a roller conveyor having the usual parallel rollers 22. Situated above the roller conveyor is an automatic stapling head generally indicated at 23 which is adjustably supported upon a standard 24. The stapling head and standard form no part of this invention and are portrayed for the purpose of illustration only, and it is to be understood that this is shown only for the desirability of centering an object such as a carton underneath the stapling head.

The centering apparatus 20 is comprised of a front centering arm 25 and a rear centering arm 26 situated at opposed sides of the conveyor table 21. The front and rear centering arms 25 and 26, respectively, are adapted to center an object such as a carton 27 shown in dotted lines in FIGURE 2. This carton is shown in the centered position after the operation of the centering arms where it is ready to be operated upon by the adjustable stapling head 23 and a stationary bottom stapling head 28.

The front centering arm 25 and the rear centering arm 26 are alike in all respects and a particular description will be given for the front centering arm. This centering arm 25, as shown more particularly in FIGURES 3 through 6 and FIGURE 9, is composed of a longitudinally extending U-shaped support 30 to which are attached a plurality of rollers 29. Throughout this description, like reference numerals will be used for the front centering arm 25 and the rear centering arm 26 except that the reference numerals for the latter will be indicated with a prime mark (').

As shown in FIGURE 1, the support 30 is provided with two braces 31 and 32, respectively. The brace 31, as shown in FIGURE 6, is secured to a movable rack 33 which is supported by a stationary U-shaped guide rail 34 extending transversely across the top of the conveyor table. Similarly, the brace 32 is secured to a movable rack 35 supported within a stationary guide rail 36, as shown in FIGURE 3.

The rear centering arm 26 has, in a similar fashion, its support braces 31' and 32' secured to interior racks 37 and 38, respectively. This is best shown in FIGURE 5 where it is seen that the racks 37 and 38 are, in turn, secured to a channel-shaped member 40 at the side flanges thereof. This channel member is positioned underneath transverse braces 41 and 42 which extend between the sides of the conveyor table 21.

The channel member 40, together with its associated racks 37 and 38, is fastened to the top of a movable piston cylindrical casing 43, as shown in FIGURE 7. The movable piston cylindrical casing 43 is positioned upon a transversely extending fixed piston rod 44 which is secured to the sides of the conveyor table at its ends. The piston rod 44 is provided with a piston ring or disc 45 which is secured in stationary manner upon the piston rod 44 so that the cylindrical piston cylinder 43 may move along the axis of the piston rod. The ends of the piston cylinder 43 are sealed around the piston rod 44 to provide sealed chambers on either side of the piston ring 45 within the piston. An air hose 46 is provided at one end of the piston and another air hose 47 is provided at the other end of the piston on the opposite side of the piston ring 45. In this manner, by the means of a reversing valve (not shown), compressed air may be admitted to the hose 46, while the hose 47 is evacuated, to apply pressure to the chamber 48 between the ring 45 and the hose 46. This will establish a region of reduced pressure in the chamber 49 between the piston ring 45 and the air hose 47 to force the piston to move to the left as shown in FIGURE 7 and cause the associated rear centering arm 26 also to move in the left-hand direction.

In order to provide for movement of the front centering arm 25, two pinions 51 and 52, as best shown in FIGURES 3, 4 and 6, are provided. The pinion 51 is mounted on the plate 53, which extends longitudinally between the brace 41, the guide rail 35, and a transverse brace 54. Similarly, the pinion 52 connecting the racks 35 and 38 is mounted upon a plate 55 extending between the transverse brace 42, the guide track 36 and another stationary transverse brace 56, while a bottom plate 57 connected between the guide rail 36 and the plate 56 supports the bottom of the pinion.

Operation

In the operation of the apparatus of this invention, particular reference will be made to the use of the centering of a carton, although it is to be understood that any other object may be employed. A carton such as that shown in the dotted lines at 27 in FIGURE 2 is advanced to the conveyor roller between arms 25 and 26 and may be either askew, off center, or otherwise incorrectly positioned. This carton should be centered if it is to be operated on by the stapling machine to close the flaps of the carton by the upper stapling head 23 and the lower stapling head 28. Also the carton should be maintained firmly in position until the stapling operation has been completed to prevent possible misalignment.

When the carton comes within the region between the arms 25 and 26, a switch 50 shown in FIGURES 4 and 5 is actuated which opens the compressed air source to the hose 46 leading into the piston chamber 48 and simultaneously the hose 47 is opened to the atmosphere so that the piston chamber 49 is evacuated. As this occurs, the increased pressure within the piston chamber 48 will cause the piston 43 to move in the left-hand direction as shown in FIGURE 7 indicated by the arrow. This causes the channel connecting member 40 and the racks 37 and 38 associated with the rear centering arm 26 to move also in the left-hand direction until the rollers 29' of the rear centering arm contact the side of the carton. Simultaneously, with the movement of the racks 37 and 38, the pinions 51 and 52 will be caused to be moved by the meshing gear teeth of the rack and pinion arrangement. This movement of the pinions 51 and 52 will cause the racks 33 and 35 connected to the front centering arm to move in a reverse direction to that of the racks 37 and 38. Thus, the front centering arm 25 is caused to move to the right, as shown in FIGURES 6 and 7.

The movement of the centering arms 25 and 26 toward one another continues until the carton has been exactly centered between the two arms and further movement is stopped by the carton itself. The pressure within the chamber 48 is regulated so that the carton may actually be moved transversely of the rollers 22 to the centered position and maintained in this position without damage after centering has been obtained. After the centered position has been attained, the centering arms will continue to bear against the sides of the carton until the actuating switch is released.

When the switch is released, pressure within the chambers 48 and 49 is reversed so that the chamber 48 is evacuated through the air hose 46 while the chamber 49 has its pressure increased through the opening of the air hose 47 to the source of compressed air. By this means, the piston 43 is caused to move to the right in FIGURE 7 and the racks 37 and 38 attached to the rear centering arm will also move in the right direction. This movement of the racks in turn causes the reversal of direction of rotation of the pinions 51 and 52 to cause the racks 33 and 35 connected to the front centering arm to move to the left in FIGURE 7 and thereby return the front centering arm simultaneously to its starting position.

During or after this operation the centered carton may be worked upon. When the centering arms are released it may be moved down the conveyor which may be slightly inclined to facilitate such movement or it may be moved by pressure from following cartons or mechanical means conventionally employed with such conveyors as will be readily understood.

Throughout the operation, the racks 33 and 35 connected to the front centering arm are guided within the guide rails 34 and 36 so that no full weight is borne by the moving parts and strain is thereby minimized. The rear tracks 37 and 38 are borne by the piston itself which reciprocates on the piston rod 44 so that in this case there is also little strain upon the apparatus.

This centering device is extremely rugged through the employment of the rack and pinion gear arrangement and stands up over repeated wear and rough treatment as is normally encountered on conveyor apparatus. Further, faulty operation is substantially minimized and avoided through the simplicity in operation of the rack and pinion gear and the supporting apparatus so that disrepair and downtime due to breakage has been greatly reduced.

Various changes and modifications may be made in this apparatus as will be apparent to those skilled in the art. Such modifications and changes are within the teaching of this invention and are included therein as defined by the claims appended hereto.

What is claimed is:

1. A device for moving containers or other articles to a desired position upon a supporting base, comprising, in combination, a supporting base, spaced longitudinally extending arms to each side of said base adapted to contact an article and move it upon said base, said arms being reciprocably movable toward and away from one another, unitary power means for effecting simultaneous movement of said arms, said power means including a piston casing centrally connected to one of said arms to move the same therewith, a stationary piston rod extending transversely across the base along which the piston casing is movable, rigid movable means cooperating between said arms whereby movement of said one of said arms causes a movement in the other of said arms in the opposite direction, said piston casing being beneath said supporting base, said piston rod being rigidly connected at each end to said base, a first rack in said rigid movable means rigidly secured at one end to one of the arms and freely extending at its other end toward the other arm in the direction of said reciprocable movement, a second rack spaced from the first rack in parallel relation thereto, said second rack being rigidly secured at one end to the other arm, and a pinion gear positioned between and engaging both said racks, whereby movement of said piston casing correspondingly and oppositely moves said arms to move said containers or the like to a desired position.

2. A centering device for positioning containers or other articles to a desired position upon a supporting base, comprising, in combination, a conveyor table base, spaced longitudinally extending centering arms adapted to contact an article and move it upon said table, said arms being reciprocably movable toward and away from one another, unitary power means for effecting simultaneous movement of said arms including a piston casing movable with one of said arms, a stationary piston rod extending transversely across the base along which the piston casing is movable and means for effecting simultaneous reciprocal movement of said arms through said power means when power is applied thereto to move one of said arms, said power means being beneath said supporting base and comprising a first pair of spaced parallel racks rigidly secured at one end to one of the arms and extending therefrom toward the other arm, and a second pair of longitudinally spaced racks rigidly secured at one end to the other arm and extending therefrom toward said one of said arms, and two separate fixed axis pinion gears each of which separately cooperates with adjacent ones of the racks of each rack pair respectively for reciprocably transmitting movement from said one of said arms to the other to move it correspondingly in the opposite direction.

3. A centering device as set forth in claim 2, in which, said conveyor table base is provided with a roller surface and said piston rod extends entirely through said piston casing and is rigidly connected adjacent each end of said piston rod to said base.

4. Apparatus for centering cartons or the like, comprising, in combination, a conveyor table, spaced centering arms along the respective sides of said table reciprocably movable toward and away from one another across the top of said table, an area-sized member beneath the top of said table secured to one of said arms, spaced parallel, outwardly facing and transversely extending racks secured to said member, a piston and cylinder mechanism mounted beneath the top of said table in transversely extending generally central position relative to said member and connected thereto to reciprocate said member and said first-named racks, a pair of spaced parallel inwardly facing and transversely extending racks connected to the other of said arms, said second-named racks facing the respectively adjacent first-named racks, and common means engaging both racks to each side of said mechanism, whereby reciprocation of said member by said mechanism correspondingly and oppositely moves said respective arms.

5. Apparatus for centering cartons or the like as set forth in claim 4, in which, the top of said table comprises rollers having transversely extending axes, said member is generally rectangular, said common means include a fixed pinion and said mechanism has a piston rod the ends of which are secured to opposite sides of said table and a cylinder connected to said one of said arms to move it therewith and thereby correspondingly and oppositely move the other arm.

References Cited in the file of this patent
UNITED STATES PATENTS

| | | |
|---|---|---|
| 635,177 | McCabe | Oct. 17, 1899 |
| 2,137,478 | Delany | Nov. 22, 1938 |
| 2,602,554 | Griffith | July 8, 1952 |
| 2,641,371 | Webster | June 9, 1953 |
| 2,789,588 | Hunting | Apr. 23, 1957 |
| 2,815,111 | Capps | Dec. 3, 1957 |

FOREIGN PATENTS

| | | |
|---|---|---|
| 1,077,679 | France | Nov. 10, 1954 |